Aug. 15, 1961 T. A. BYLES 2,996,655
CURRENT LIMITER FOR GENERATORS
Filed Aug. 5, 1958

INVENTOR.
Theodore A. Byles
BY Mueller & Aichele

Attys.

United States Patent Office 2,996,655
Patented Aug. 15, 1961

2,996,655
CURRENT LIMITER FOR GENERATORS
Theodore A. Byles, Villa Park, Ill., assignor to Motorola, Inc., Chicago, Ill., a corporation of Illinois
Filed Aug. 5, 1958, Ser. No. 753,312
1 Claim. (Cl. 322—25)

This invention relates to voltage regulators and more particularly to voltage regulators for use in connection with the electrical systems of vehicles wherein voltage is regulated by controlling the current through the field coil of a generator.

In the past, voltage regulators for use in vehicles have often been provided with electro-mechanical devices such as relay devices for limiting the amount of current through the field coil of a generator. Such devices may be unreliable in their operation due to mechanical wear and because of the variety of conditions under which the vehicle operates. Recently, all electronic voltage regulators utilizing transistors for sampling and output control have been introduced. Such regulators have often included a current sensitive portion wherein the output current is sampled and converted to a bias voltage for a transistor which ultimately regulates the field coil current. Heretofore, it has been necessary to provide a resistance element in series with the output current in order to produce a voltage drop proportional to such current. In an automobile, the output current may be very high so that the voltage drop across even a resistor of small ohmic value may be quite considerable. This results in an undesirably high power loss and in a reduction in the available voltage of a system. This disadvantage of the all-electronic voltage regulator has in some instances prevented its adoption in preference to conventional electro-mechanical regulators which are otherwise generally inferior but which are characterized by moderate power losses.

It is an object of the present invention therefore to provide effective all-electronic current limiting means for use in a vehicular electrical system wherein the voltage output of a generator is controlled by the current in a field coil.

It is a further object of the invention to provide an all-electronic voltage regulator having a power consumption comparable with that of electro-mechanical regulators while being more reliable than the latter.

It is another object of the invention to provide means for converting a current sample in a voltage regulator system to a control voltage signal without the introduction of an undesirable series resistance into the system.

A feature of the invention is the provision of a Hall effect device to generate a signal voltage proportional to an inductively sampled current in a vehicular electrical system.

A further feature of the invention is the provision of a voltage regulator wherein a Hall effect device is coupled to feed a voltage signal to an amplifying transistor which signal is proportional to a sampled current and which signal is subsequently amplified to provide a biasing signal to a series control transistor in order to control the output voltage of the system.

In accordance with the invention, a voltage regulator system wherein the voltage output of a generator is regulated by controlling the current through its field coil is provided with a serially connected inductor to produce a magnetic field proportional to the output current. A body of semiconductor material is positioned within the magnetic field and connected across the output of the generator so that a current is passed through it in a direction perpendicular to the magnetic field. This produces a potential drop across the semiconductor body which is known as the Hall effect voltage and which is proportional to the product of the current through the body and the magnetic field. The resulting Hall effect voltage is applied to an amplifying device, e.g. across the base and emitter of a transistor so that it is amplified, and the resulting amplifier signal is used to bias a series control transistor to alter its conductivity in a direction to prevent the output current from exceeding a predetermined value. Because the inductor means through which the series current is passed to generate the magnetic field has essentially no resistive component, its incorporation into the circuit does not result in any voltage drop across it or in any power consumption. This is to be contrasted with voltage regulators in which the current is sampled by means of a series resistor. The power loss in this resistor may be on the order of 10 watts.

Figure 1:
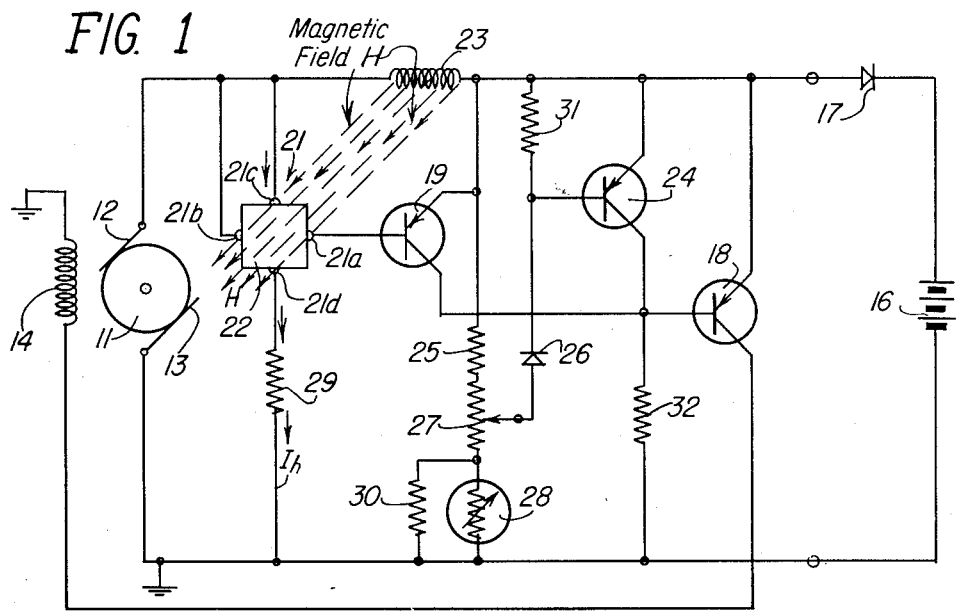
FIG. 1 is a schematic diagram illustrating a voltage regulator system in accordance with one embodiment of the present invention.

FIG. 1 shows an arrangement that may be used in connection with the electrical system of an automobile. It includes the generator armature 11 rotatable within the field coil 14. The storage battery 16 is coupled to the generator armature through the serially connected cutoff diode 17.

Figure 2:
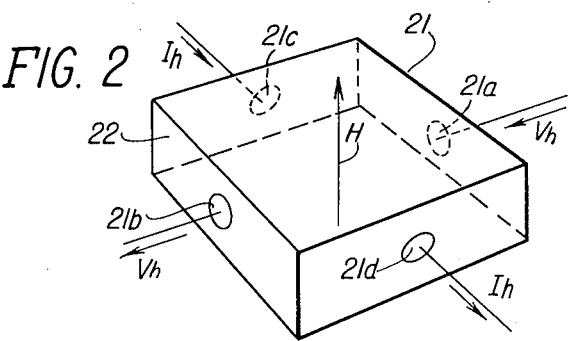
FIG. 2 is a diagrammatic illustration showing the operation of a Hall effect device.

A control transistor 18 is connected in series with the field coil 14 at its collector and has its base coupled to the collector of the current sensitive transistor 19. These transistors are of the same conductivity type, that is, both PNP as shown or both NPN. The base of transistor 19 is coupled to the terminal 21a of the Hall effect device generally indicated at 21 and illustrated in more detail in FIG. 2. One side of the armature 11 is connected to terminal 21b which is on the opposite side of the generally rectangular semiconductor body 22 which forms the operative portion of the Hall effect device 21. The semiconductor body 22 may be any material producing the Hall effect. Terminals 21c and 21d are provided on the other pair of the faces of the body 22 connecting it across the output of the generator so that a current designated as $I_h$ may pass through the body in a predetermined direction. Inductor means 23 is connected in series with the armature 11 and is arranged to provide a magnetic field H in a direction perpendicular to the direction of the current $I_h$.

The voltage-sensitive section of the regulator includes transistor 24 coupled to the Zener diode 26 which provides a reference voltage. A voltage divider network made up of resistor 25, potentiometer 27, thermistor 28 and resistor 30 is connected across the output of the generator. One side of the Zener diode 26 is connected to the potentiometer 27 so that the reference voltage may be adjusted. Thermistor 28 effectively adds to the breakdown voltage of Zener diode 26. Since the thermistor has a negative temperature coefficient, the amount of added bias increases as the ambient temperature drops thus permitting the system to have a higher maximum voltage output during winter months when higher voltages are needed to charge battery 16.

Operation of the regulator described depends upon the so-called Hall effect. If a semiconductor body is placed in a magnetic field and a current is made to flow through this sample in a direction perpendicular to the magnetic field, a voltage is produced across the body along an axis normal to both the magnetic field and the direction of the current flow. This is illustrated diagrammatically in FIG. 2. It has been established that the so-called Hall voltage ($V_h$) thus produced across the body (in this case the voltage between terminals 21a and 21b) is proportional to the product of the input current $I_h$ and the magnetic field strength H. Thus, when output current flows through the inductor 23 it produces a magnetic field directly proportional in strength to the magnitude of the current. In the embodiment illustrated, the applied current $I_h$ through Hall device 22 and the resistor 29 is substantially constant. By connecting the emitter of transistor 19 to terminal 21b and the base to terminal 21a, the Hall voltage $V_h$ is applied as a signal to the current sensitive transistor 19 and is amplified and applied as a base biasing voltage to the series control transistor 18. The bias on the base of transistor 18 controls its conductivity which in turn controls the current in the field coil 14.

The transistor 19 is so biased that it will normally be non-conductive but when the current through inductor 23 reaches a predetermined level it will produce a Hall voltage $V_h$ applied between the base and emitter sufficient to bias transistor 19 to conduction. This results in an amplified current and in conduction of transistor 18 and restores the current in coil 14 to a lower value.

The voltage-sensitive transistor 24 is normally biased to a cutoff condition. When the maximum allowable output voltage is exceeded, the diode 26 commences conduction in reverse direction and the current flowing in resistor 31 establishes a bias on transistor 24 so that it conducts through resistor 32 thereby reducing the conduction of control transistor 18 and the energizing current through the field coil 14.

Figure 3:
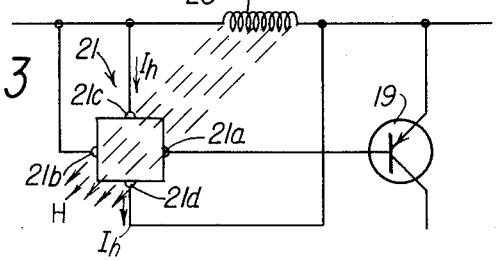
FIG. 3 is a partial schematic diagram showing an alternative connection for the Hall effect device.

FIG. 3 illustrates an alternative connection of the Hall effect device. In this embodiment, device 21 is connected in parallel across inductor 23. In this case the applied current $I_h$ is also proportional to the output current so that Hall voltage $V_h$ is a function of the square of the output current. This tends to improve limiting action.

The present invention provides therefore, a means for regulating voltage by limiting the current in the field coil of the generator without introducing an undesirable resistive element into the circuit. This is done by taking advantage of the Hall effect wherein a voltage proportional to the current through an inductor is used as a biasing signal to regulate conduction of a control transistor.

I claim:

In a vehicle electrical system which includes a generator having output terminals and field exciting means for controlling the output of said generator and in which a load circuit is adapted to be connected across said output terminals; a regulator for such system including in combination, a first conductor being adapted to be connected to one of the generator output terminals, a second conductor being adapted to be connected to said load circuit, a reference conductor being adapted to be connected between the other generator output terminal and said load circuit, a Hall effect device having a pair of current terminals and a current axis therebetween and having a pair of voltage terminals and a voltage axis therebetween, means coupling said current terminals between said first conductor and said second conductor so that current proportional to the output current is shunted through said device along said current axis and between said current terminals, said Hall effect device also having inductor means connected in series between said first and second conductors to generate a magnetic field which is directly proportional to the output current passing through said inductor means, said inductor means being disposed to apply the field in a direction transverse to said current and voltage axes to develop a voltage between said voltage terminals which is proportional to the square of the output current, a transistor having base, emitter and collector electrodes, means coupling said voltage terminals between said base electrode and said first conductor for applying a bias voltage to said transistor which is varied by the voltage developed between said voltage terminals, means coupling said emitter and collector electrodes in series between said second conductor and the field exciting means whereby the collector current of said transistor controls the output of said generator in response to changes in the output current.

References Cited in the file of this patent

UNITED STATES PATENTS

| | | |
|---|---|---|
| 1,778,795 | Craig | Oct. 21, 1930 |
| 2,616,072 | Edwards et al. | Oct. 28, 1952 |
| 2,809,301 | Short | Oct. 8, 1957 |

FOREIGN PATENTS

| | | |
|---|---|---|
| 671,198 | Great Britain | Apr. 30, 1952 |
| 958,034 | Germany | Feb. 14, 1957 |